(12) United States Patent
Vander Griend et al.

(10) Patent No.: US 8,839,135 B2
(45) Date of Patent: Sep. 16, 2014

(54) METHOD AND APPARATUS FOR IRRIGATION SYSTEM DESIGN REGISTRATION AND ON-SITE SPRINKLER PACKAGE CONFIGURATION VERIFICATION

(75) Inventors: Loren Vander Griend, Walla Walla, WA (US); Craig B. Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 579 days.

(21) Appl. No.: 13/074,866

(22) Filed: Mar. 29, 2011

(65) Prior Publication Data

US 2012/0254784 A1  Oct. 4, 2012

(51) Int. Cl.
*G06F 3/048* (2013.01)
*G06Q 10/08* (2012.01)
*G06Q 10/06* (2012.01)

(52) U.S. Cl.
CPC ........ *G06Q 10/06315* (2013.01); *G06Q 10/087* (2013.01)
USPC .......................................... 715/771; 715/772

(58) Field of Classification Search
USPC ................................................ 715/771, 772
See application file for complete search history.

(56) References Cited

U.S. PATENT DOCUMENTS

| | | | |
|---|---|---|---|
| 6,230,091 B1 | 5/2001 | McQuinn | |
| 6,678,580 B2 | 1/2004 | Benneweis | |
| 6,823,239 B2 | 11/2004 | Sieminski | |
| 6,942,162 B2 | 9/2005 | Guskov et al. | |
| 7,003,357 B1 | 2/2006 | Kreikemeier et al. | |
| 7,004,402 B2 * | 2/2006 | Borders et al. | 239/69 |
| 7,010,396 B2 | 3/2006 | Ware et al. | |
| 7,451,008 B2 | 11/2008 | Kobayashi | |
| 2003/0093159 A1 * | 5/2003 | Sieminski | 700/12 |
| 2005/0284645 A1 | 12/2005 | Golinveaux | |
| 2006/0027677 A1 | 2/2006 | Abts | |
| 2006/0041557 A1 | 2/2006 | Asakawa | |
| 2006/0181390 A1 * | 8/2006 | Zigmond et al. | 340/5.22 |
| 2009/0099701 A1 | 4/2009 | Li et al. | |
| 2009/0157521 A1 | 6/2009 | Moren et al. | |
| 2009/0326723 A1 * | 12/2009 | Moore et al. | 700/284 |

FOREIGN PATENT DOCUMENTS

| | | |
|---|---|---|
| AU | 2005100621 | 9/2005 |
| KR | 20050013312 | 2/2005 |

OTHER PUBLICATIONS

Lindsey Getz, "Perspectives on 2011", Lawn & Landscape, Feb. 10, 2011, http://www.lawnandlandscape.com/Article.aspx?article_id=112729 (1 page).

Aquatrace, Irrigation Mapping, Juniper systems, Dec. 2010, www.junipersys.com (2 pages).

* cited by examiner

*Primary Examiner* — Andrea Leggett
(74) *Attorney, Agent, or Firm* — Nixon & Vanderhye P.C.

(57) ABSTRACT

Internet-accessible system and method for customized design and on-site verification of agriculture irrigation systems includes one or more of: 1) sprinkler package configuration software operable on a user's PC or accessible via an Internet website, 2) Internet-accessible proprietary irrigation system registry database and user interface, 3) computer-controlled automated component selection and labeling system for placing barcode or RFID information on components, and 4) portable wireless location-aware communication device operable at or near an irrigation site for accessing the registry database and obtaining sprinkler package configuration information specific to a particular irrigation system based on location and/or a particular irrigation system component detected in proximity to the portable communication device.

16 Claims, 8 Drawing Sheets

Main Menu Commands

~ 420

| | |
|---|---|
| File | Open, save, and print input and chart files. |
| Options | Update program or set its environment. |
| View | Open or close chart and summary windows. |
| Inputs | Open input windows for all design variables. |
| Design | Perform design calculations and display chart. |
| Products | Open help files with product information. |
| Help | Open program help files. |

File Toolbar

~ 421

| | |
|---|---|
| Open | Opens an existing document. |
| Save | Saves an opened document using the same file name. |
| Print | Opens the Print dialog box and allows you to print the chart. |
| Help | Calls Help file. |
| What Is? | Opens Help file to the subject you click. |

Inputs Toolbar

~ 422

| | |
|---|---|
| Labels | Enter new Customer, Identification, or Log Number. |
| System | Enter pressure, flow, and other system specifications. |
| Spans | Display currently selected spans. |
| Selection Guide | Choose new spans. |
| Create | Create new spans. |
| End Configuration | Allow sprinkler to be used in an end drain, and set the coverage of the end sprinkler. |
| Outlet Availability | Define plugged outlets and add special components. |
| Drive Train | Specify drive train data. |
| End Gun | Select end gun. |
| Regulators | |
| Pressures | Set regulator pressures. |
| Flows | Set regulator pressures. |
| Models | Set regulator outlet type and duty rating (color). |
| Sprinklers | Select sprinklers. |
| Mounting | Choose mounting assemblies. |
| Create | Create new assembly. |
| Parts Summary | Set pricing, shipping, and include other items in the chart. |
| Drop Package | Specify how drop lengths are calculated. |

Design Icon

| | |
|---|---|
| Design Command | Perform calculations. |

METHOD AND APPARATUS FOR IRRIGATION SYSTEM DESIGN REGISTRATION AND ON-SITE SPRINKLER PACKAGE CONFIGURATION VERIFICATION

TECHNICAL FIELD

The subject matter disclosed herein relates generally to computer-assisted design, registration and verification of agriculture irrigation systems and more particularly to an Internet website accessible system for online registration of irrigation system geographic location and component configuration information and for on-site verification of sprinkler head/nozzle in situ.

BACKGROUND AND SUMMARY

It was noticed by the inventors that in the design, installation and maintenance of large agriculture irrigation systems, it is highly desirable in this day and age to be able to have access to interactive software tools and applications that may be used in assisting an owner/designer in site planning, proper component selection and accurate packaging of the numerous components typically needed for installation at a particular irrigation site. For example, the inventors realized it would be desirable to have access via the Internet to an easy-to-use interactive software tool that could be used to optimize or update an irrigation system design to suit site-specific concerns such as known metrological conditions, soil conditions and type of crops being irrigated. Moreover, the inventors realized it would also be desirable to have a means for conveniently tracking system components and configuration information for a plurality of different irrigation systems, and be able to have access to such information when at an irrigation site or, for example, wherever and whenever needed at locations remote from the user's home or office PC system.

For example, in considering potential designs for a self-propelled agriculture irrigation system that uses a water distribution boom line, such as found in conventional center pivot and linear movement type irrigation systems, the inventors realized it is highly desirable to be able to fashion a design that uses the optimum number of outlets and sprinkler heads along the length of the boom, as well as the optimum inter-head spacings and nozzle size/type for each head to maximize efficiency and minimize overall operating costs. Typically, once a design for a particular site is finalized, the individual irrigation system hardware components including the various different sprinkler head nozzle types/models that were custom selected for that particular site are ordered and assembled into packages for shipping to the site for installation. In the context of designing, installing and maintaining agriculture irrigation systems as described herein, a specification defining the components, outlet locations, head spacings, nozzle types, etc. and their specific arrangement in a particular irrigation system is hereinafter referred to as a sprinkler package configuration (SPC). The inventors also noticed that if, for example, a particular sprinkler package configuration or other irrigation system hardware order is incorrectly assembled/packaged prior to shipping to a customer or, perhaps more commonly, if during the on-site construction of a particular irrigation system the wrong nozzle type/model is installed at a sprinkler head, or if sprinkler heads are positioned at wrong positions or intervals along the boom line, the end result may fail to apply water effectively. Obviously, for even simple configurations and moderately sized irrigation systems, it can be difficult to discover and identify such faults, as well as time consuming and costly to correct such faults after an installation is complete and operation has begun.

Consequently, the inventors recognized that there is a need to be able to quickly and conveniently check and verify proper placement of sprinkler heads and proper nozzle size/type in situ at an irrigation system site both during and after the setup, construction or installation of a new irrigation system or during an upgrade or routine maintenance of an existing system. In addition, the inventors also recognized that currently unknown and missing from the agriculture irrigation equipment and support industries is the provision of any sort of portable and inexpensive means and/or method that enables one to conveniently perform checking and verification of irrigation system components in situ at diversely located irrigation sites "as built" or during installation. The inventors also recognized that it would be desirable to be able to visit a particular irrigation site "after built" for performing maintenance checks, upgrades or the like on existing nozzles and other system components while having some means for convenient access and reference to the original "as built" system design specifications. Accordingly, disclosed herein the inventors provide a nonlimiting illustrative example implementation of an apparatus and method for implementing and registering an irrigation system design and for enabling on-site in-situ checking and verification of an irrigation system, its constituent components, components specifications, as well as method and apparatus for assembly and verification of customized sprinkler system hardware packages and providing a convenient means for on-site checking and verification of irrigation system components.

In one nonlimiting illustrative example implementation of an irrigation system design and configuration verification method and apparatus as disclosed and claimed herein, an Internet-accessible server is provided with a user interface and a proprietary irrigation system Registry Database which maintains sprinkler package configuration information and associated geographic location data for a plurality of different agriculture irrigation installations. The exemplary user interface suggested herein provides secure registration and enables customization and storage of one or more specific irrigation system designs and corresponding sprinkler package configurations including precise geographic location data of individual sprinkler components in an irrigation system for a plurality of users.

In another nonlimiting illustrative example implementation, irrigation system and sprinkler package configuration (SPC) design software application that is operable on a user's PC is provided to a user or made accessible for use via an Internet website. This irrigation system and sprinkler package configuration (SPC) design software application effectively enables a user to design and register a customized irrigation system and specify an associated sprinkler package configuration (i.e., a customized record of irrigation system components and specifications for a particular irrigation installation site) using a conventional PC, workstation or laptop computer.

In another nonlimiting illustrative example implementation, an irrigation system design and verification system includes an automated sprinkler head nozzle assembly and labeling system/machine for putting together customized packages of irrigation system components (sprinkler package) containing specific sprinkler head/nozzle combinations for a particular irrigation installation site and placing component identification information on each sprinkler head/nozzle or other component in the form of barcodes or RFID tags or the like.

Another nonlimiting illustrative example aspect or implementation of the design and verification system disclosed herein includes a location-aware mobile smart-device/portable computer system having a CPU memory and computer instruction code for enabling the device to wirelessly connect to the Internet or to a WAN for communicating with a remote computer/server that serves as a proprietary Registry Database for storing and checking information related to irrigation systems.

Another nonlimiting illustrative example implementation contemplated herein utilizes a location-aware portable smart-device/computer incorporating GPS and/or other GIS (geographic information system) technology implementing hardware, includes a display and runs proprietary mobile irrigation system design and mapping software that enables a user physically located at a particular irrigation installation site to generate and map an irrigation system "as built" or perform in-situ verification of individual component configuration/location information, while at the same time being in data communication with remote database resources for uploading/downloading or updating and/or researching or accessing current or archived irrigation system and sprinkler package configuration (SPC) information.

In another nonlimiting illustrative example implementation, a proprietary software application (app) is provided which is operable on a location-aware portable smart-device/cell phone, or laptop computer to enable a user who is physically located at a particular irrigation installation site to contact a remote proprietary database and obtain the irrigation system's sprinkler package configuration (SPC) information to perform an in-situ verification of that information. For example, a user running the proprietary application on smart phone can instantly verify the particular model type and boom-line position of one or more sprinkler heads/nozzles by checking the information in a registered sprinkler package configuration file which is automatically downloaded and displayed on the smart phone by the application.

In another nonlimiting illustrative example implementation, a location-aware Mobile Registry Interface (MRI) communication device is provided with apparatus input, which may be separately connected or constructed integral to the communication device, for use in scanning a barcode ID tag placed on a sprinkler head/nozzle or other IS components. Alternatively, the MRI device may include integral circuitry or may be provided with an input device for wirelessly receiving RFID information from an RFID tag placed on nozzle components or equipment at the site.

In yet another nonlimiting illustrative example implementation disclosed herein, installation of a particular sprinkler package at an irrigation site is accomplished with the assistance of a location-aware wireless mobile device equipped with software for communicating and interfacing with a remote database containing sprinkler package configuration file information. The location-aware mobile device uses GPS location information and specific ID information obtained from a sprinkler system component and checks this information with information in the sprinkler package configuration file. This enables easy on-site verification of the exact placement and nozzle size of each sprinkler head or other irrigation component during and/or after the installation process at any particular site.

In yet another nonlimiting example implementation disclosed herein, an agriculture irrigation system installation design and verification system is provided for designing the configuration of sprinkler components to be used at a specific irrigation site, setting/labeling each of the components with a specific ID and confirming/verifying component ID and location at a particular irrigation site. In this nonlimiting example, the design and verification system incorporates one or more of: 1) interactive sprinkler package configuration (SPC) software operable on a user's PC or accessible via an Internet website which enables a user to design and specify a sprinkler package configuration (SPC) for a particular irrigation installation, 2) an Internet-accessible registry database and user interface which maintains sprinkler package configuration data and associated geographic location information for a plurality of different agriculture irrigation installations, 3) a computer-controlled automated sprinkler head nozzle selection and labeling machine/system for packaging together a customized assemblage of irrigation system hardware components/parts in accordance with a specified SPC, and placing component identification/information tags in the form of barcodes or RFID microchips tags or the like on each sprinkler head/nozzle or other component/part in the customized package prior to shipping to an installation site, and 4) a portable/mobile location-aware smart device (e.g., laptop, handheld PC, Smartphone, Blackberry, PDA, tablet computer, etc.) that is operable at an irrigation site/field to wirelessly access the remote registry database and obtain sprinkler package configuration information specific to a particular irrigation system or to a particular irrigation system component. The smart mobile device is provided with an input, which may be a separate device or comprise circuitry and apparatus integral to the mobile device, for scanning a barcode ID label placed on sprinkler head/nozzle components or receiving RFID information from component tags or equipment at the site. The component ID information is then used in conjunction with data accessed wirelessly from the registry database to assist with the initial installation of equipment at the site or to verify the correct installation of equipment at later times.

In a computer network, such as the Internet, many different kinds of computers may be used as information "servers" and information requesters or "clients". In general, personal computers or workstations, laptops, and other smart mobile communication devices containing a computer/processor are the sites at which a human user operates a computer to make requests for data from other computers or servers on the network. Usually, the requested information/data resides in one or more remote computers which make up the Internet. In this specification, the terms "client" and "server" are used to refer to a computer's general role as a requester of data (client) or provider of data (server). Further, each computer may request data in one transaction and provide data in another transaction, thus changing the computer's role from client or server, or vice versa.

On the Internet, the "World Wide Web" uses a client-server model to communicate information between clients and servers. As such, "Web" servers are coupled to the Internet and respond to document requests from Web clients. Web clients, via Web browsers, allow users to access Web "sites" located on Web servers which provide one or more displayable Web "pages" containing information, documents and/or interactive program applications.

An example of a client-server system interconnected through the Internet may include a remote server system interconnected through the Internet to a client system. The client system may include conventional components such as a processor, a memory (e.g., RAM), a bus which couples the processor and memory, a mass storage device (e.g., a magnetic hard disk or an optical storage disc) coupled to the processor and memory through an I/O controller and a network interface, such as a conventional modem. The client system may be a stationary workstation or a mobile smart device with a display and the ability to input data and connect to or communicate via the Internet.

An example computer system/device used in implementing the method and apparatus disclosed herein may comprise various hardware and software components such as a multi-tasking operating system, data storage devices, a display device, a user interface device such as a keyboard and/or other input devices connected to a CPU, personal computer or computer network operating in conjunction with other useful and/or unrelated interface hardware and application software. For example, a multitasking operating system program such as, but not limited to Apple Mac OSX®, Linux, Microsoft®Windows® or IBM OS/2®, or the like may be executed on the CPU to manage primary operations. The computer or CPU may also be linked to various remote databases and/or servers via private communications lines or the Internet. Alternatively, the methods disclosed herein may be expressed in a software application used on a mobile computing device or as part of a software suite of applications used in a computer network or Internet-accessible server.

BRIEF DESCRIPTION OF THE DRAWINGS

The block and flow diagrams in the figures presented herein do not necessarily represent an actual physical arrangement of the example system, but are primarily intended to illustrate major structural components in convenient functional groupings so that the nonlimiting illustrative exemplary implementation presented herein may be more readily and easily understood.

DETAILED DESCRIPTION OF NONLIMITING EXAMPLE EMBODIMENTS

A nonlimiting illustrative example implementation of a system and method for the design and in-situ checking and verification of irrigation system components is disclosed herein wherein an Internet-accessible, computer-assisted system and method are provided for enabling a user to create and register customized designs for one or more agriculture irrigation systems. The exemplary method and apparatus disclosed herein enables a user to specify and register specific irrigation system component configurations including sprinkler head and nozzle specifications in an Internet-accessible database in the form of sprinkler configuration package (SPC) file information for use in the construction and installation of center pivot and linear movement irrigation systems or the like. In particular, an exemplary method and apparatus disclosed herein provides a quick and convenient means for checking and verification of individual sprinkler head/nozzle type/model and position while on site at an irrigation system location against configuration information previously registered and stored in a remote database. One nonlimiting example of an irrigation system design and component placement/location verification system disclosed herein incorporates one or more of: 1) sprinkler package configuration software that is operable on a user's PC or is accessible via an Internet website for enabling a user to custom design and register/upload a sprinkler package configuration for a particular irrigation system site installation, 2) an Internet-accessible proprietary irrigation system registry database and user interface which maintains sprinkler package configuration information and associated geographic location data for a plurality of different agriculture irrigation installations, 3) a computer-controlled automated sprinkler head nozzle selection and labeling machine/system for collecting a specified package of irrigation system component hardware and for placing specific component identification information in the form of barcodes or RFID tags or the like on each sprinkler head/nozzle or other component in the customized hardware package, and 4) a portable/mobile location-aware smart device that is operable at an irrigation site to wirelessly access the remote registry database and obtain sprinkler package configuration information specific to a particular irrigation system or to a particular irrigation system component in proximity to the mobile device.

Figure 1:
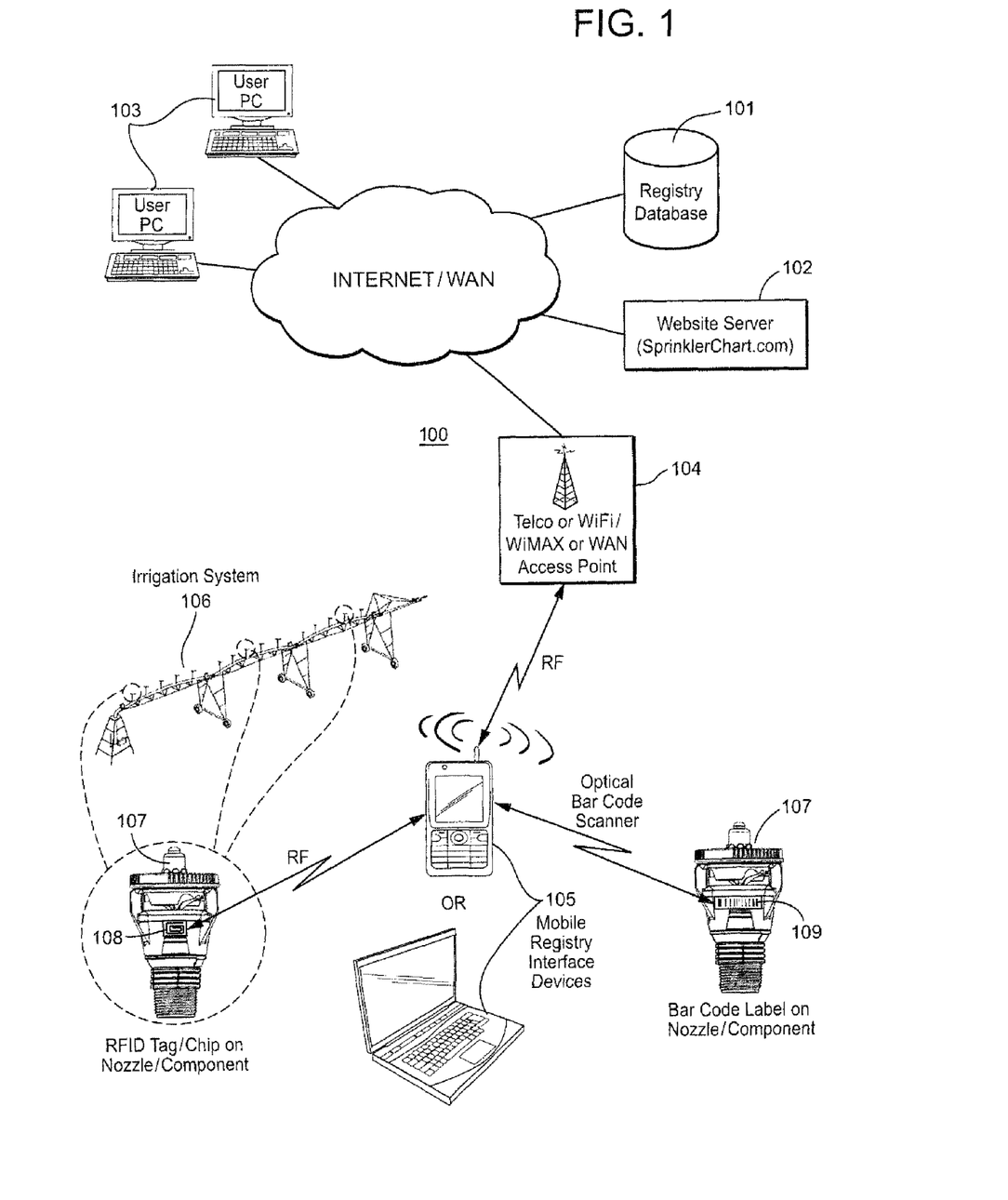
FIG. 1 is a diagrammatic illustration of a system hardware arrangement for a nonlimiting example implementation of an agriculture irrigation system design registration and in-situ component checking and verification system.

Referring first to FIG. 1, a diagrammatic illustration depicts a hardware arrangement and environment 100 for a nonlimiting example implementation of an agriculture irrigation system Sprinkler Package Configuration (SPC) file registration and in-situ component checking and verification system as taught and disclosed herein. In this illustrative example, a basic irrigation system component checking and verification system arrangement is shown as including at least one SPC file Registry Database computer/system 101 that is accessible either directly or via the Internet by one or more user workstations/PCs 103, one or more handheld/portable location-aware Mobile Registry Interface (MRI) devices 105, and at least one irrigation system component ID tag/label 108/109 that is physically attached to a sprinkler head nozzle 107 or other component in an agriculture irrigation system 106. It is also contemplated that the in-situ checking and verification system as taught herein include an Internet Website Server 102 for providing Internet access to proprietary web-based applications or tools for designing/creating custom sprinkler package configurations and registering irrigation sites and corresponding SPC information.

Preferably, the SPC Registry Database and server system 101 is an Internet-accessible proprietary secure computer/system that maintains a database for registering and storing irrigation system specification information in the form of SPC files and a server for providing a website interface to the Registry Database 101. Each PC/workstation 103 may also be provided with a custom software application for directly accessing and interfacing with Registry Database server 101 or, alternatively, may provide a user with access to SPC files in the Registry Database via the Internet by using a conventional web browser and accessing a proprietary Website Server 102 capable of accessing Registry Database 101 for that purpose. PC/workstation 103 may be a conventional PC or similar computer system having a wired or wireless connection (not shown) to the Internet and having the normal and conventional I/O user interfaces such as a keyboard, mouse and display.

At least one portable/mobile Registry Database interface device 105 is contemplated for enabling a user to remotely access the SPC Registry Database to perform in-situ checking and verification of sprinkler head nozzle components from an irrigation system site. One nonlimiting example implementation contemplated for such a mobile registry interface (MRI) device is a location-aware smart phone, personal digital assistant (PDA), laptop or tablet computer or similar handheld portable computer device having an integral display and a wireless means of access to the Internet (e.g., a conventional GPS enabled smart phone, iPod®, iPad®, or the like). It is also contemplated that an MRI device of this sort would include a touch-sensitive display or at least a conventional display and an integrated keyboard/keypad, and would also have the capability to wirelessly transmit and receive data and text to a remote server/computer.

The use of location-aware MRI devices 105 for communicating information from an irrigation site to Registry Database 101 is illustrated in FIG. 1. In a nonlimiting example, an MRI device 105 may be a Wi-Fi/WiMAX or cellular telecommunications-capable laptop computer or a handheld smartphone type device having an internal processor that is capable of executing one or more software applications such as a web browser, and includes a display and a touch screen or keypad for accepting user inputs and/or displayed menu item selections. It is contemplated that an MRI device 105 would also include an integral GPS receiver or other comparable geographic location determining hardware or capabilities, although this may not be a necessary requirement in all circumstances. It is also contemplated that an MRI device 105 would include integral WiFi/WiMAX and/or other cellular or satellite telecommunications hardware for wirelessly accessing the Internet or communicating directly with Registry Database 101. In addition, it is contemplated that an MRI device 105 has the capability to read or scan barcodes or includes a barcode reading/scanning device (not shown) or includes a conventional RFID receiving device (not shown) that is either operatively connected to the MRI device or integral to circuitry within the device.

In another nonlimiting example implementation, an MRI device 105 may simply include the capability to connect directly to a wide area network (WAN) via a conventional telco or WAN/WiFi/WiMAX interface or access point 104. The access point 104 may be accessed via a cellular data network, such as for example the Enhanced Data rates for GSM Evolution (EDGE) network or via WiFi/WiMAX 802.11x RF communication or via 3G or 4G telecommunications. As may be appreciated, the use of a conventional 3G or 4G telecommunications network by an MRI device 105 may provide a more direct connection to the Internet with high-bandwidth communication channels for transferring and acquiring data to/from Registry Database 101.

For example, it is contemplated that an MRI device 105 may connect to the Internet Website Server 102 directly via a physical local area network (LAN) interface connection (not shown) or wirelessly via a Wi-Fi/WiMAX or a wide-area network (WAN) communication channel link, which may be, for example, a cellular data network such as EDGE, or a 3G or 4G network or other telecommunications link. It should be appreciated that the MRI device 105 may establish a communications connection either directly to the Registry Database 101 or to Website Server 102 via a conventional wired interface connection to the Internet or via a conventional Wi-Fi/WiMAX or Telco cellular access point 104. In addition, one or more network access points 104 may be provided for added connectivity to MRI device 105.

In the presently disclosed nonlimiting example implementation, the inclusion of a barcode scanner or RFID receiver in an MRI device 105 enables wireless in-situ acquisition of sprinkler head/nozzle component ID information by a user present at an irrigation system site. In particular, it is contemplated that some sort of portable handheld device 105 may be used at an irrigation site to scan a barcode label or tag attached to a sprinkler head/nozzle or, alternatively, wirelessly pick up radio frequency ID information from an RFID device attached to a sprinkler head/nozzle component when held near.

FIG. 1 illustrates two example portable electronic devices 105 that may be configured as an MRI device. An MRI device 105 may include at least one central processing unit (CPU) and a main memory. The CPU may include one or more microprocessors, and the microprocessors may be "general purpose" microprocessors, a combination of general and special purpose microprocessors, or ASICS. Additionally or alternatively, the CPU may include one or more reduced instruction set (RISC) processors, video processors, or related chip sets. The CPU should provide processing capability sufficient to execute at least a basic operating system, run various applications, and/or provide processing for one or more of the techniques described herein. Applications that may run on electronic MRI devices 105 may include, for example, software for managing and playing audiovisual content, software for managing a calendar, software for using the resources of telephone capabilities, and software for using the resources of other electronic devices. A main memory of MRI device 105 may be provided and communicably coupled to the CPU, which may store data and executable code. This main memory may include volatile memory such as RAM, but may also include nonvolatile memory, such as read-only memory (ROM) or Flash memory. In buffering or caching data related to operations of the CPU, the main memory may store data associated with applications running on the MRI device 105.

The electronic device 105 may also include nonvolatile storage. The nonvolatile storage may include any suitable nonvolatile storage medium, such as a hard disk drive or nonvolatile memory, such as Flash memory. It is contemplated that a display also be provided for MRI device 105. The display may be any suitable display, such as liquid crystal display (LCD), a light-emitting diode (LED) based display, an organic light emitting diode (OLED) based display, a cathode ray tube (CRT) display, or an analog or digital television. In a preferred but nonlimiting example of MRI device 105, the display may function as a touch screen through which a user may interact to input commands or information. It is contemplated that MRI device 105 also include an application specific user interface that provides a graphical user interface (GUI) on a display of the MRI device. In practice, as is conventional in the art, this user interface application may operate via the device CPU, using the main memory and a nonvolatile long-term storage memory.

As should be appreciated by one of ordinary skill in the art, one or more program applications may be operable/accessible to a user and be displayed on the display of the MRI device 105. The applications may run on the CPU in conjunction with the main memory, the nonvolatile storage, the display, and the user interface. As will be discussed in greater detail below, instructions forming a proprietary software application stored in the main memory, the nonvolatile storage, or the CPU of the electronic device may enable a user to use the MRI device 105, to wirelessly access a remote database and download and view specific registered information relating to a particular agriculture irrigation system. As such, it should be appreciated that the instructions for carrying out such techniques on MRI device 105 may be accomplished using a proprietary standalone application, or alternatively, by a conventional web browser application having appropriate plug-ins, or alternatively, by an HTML5 capable web browser, for seamlessly communicating with a proprietary website server or for directly interfacing with the remote database 101.

In certain embodiments, MRI device 105 may include location-aware circuitry. The location-sensing circuitry may be conventional global positioning system (GPS) circuitry, but may also be one or more algorithms and databases, stored in nonvolatile storage or main memory and executed by the CPU, which may be used to infer location based on various observed factors. For example, such location-aware circuitry may be an algorithm and database used to approximate geographic location based on the detection of local 802.11x (Wi-Fi) networks or nearby cellular phone towers. As discussed below, MRI device 105 may use such location-aware circuitry for carrying out certain information retrieval functions. For example, the location-aware circuitry may be used in MRI device 105 to determine a user's location during an event such as inspecting newly installed sprinkler head components at an irrigation system site. The user's location during the inspection event may thereby cause different information to be retrieved or displayed on MRI device 105.

FIG. 1 also illustrates an RFID tag 108 that may be associated with any irrigation system component such as a sprinkler head or nozzle component 107. The RFID tag 108 may adhere to the nozzle component 107, and may provide certain ID and/or nozzle type/model information to MRI device 105 that may be used to access information in the Registry Database 101. By way of example, the RFID tag 108 may instruct the MRI device 105 as to a specific component ID and/or an SPC file ID in which the component is registered/listed and/or which irrigation system the component is a part and/or an IP address to locate and access the appropriate SPC file directly over the Internet. Thus, the RFID tag 108 may be particularly effective to enable the MRI device to quickly and automatically access the Registry Database 101 and automatically determine if the tagged component is properly located within the irrigation system and if the tagged component has the correct specifications for that particular position/location within the irrigation system. Components of the RFID tag 108 may include, for example, an adhesive portion or means for attaching it to an irrigation system component and a conventional RFID transponder microchip (not shown) which is well known in the art.

As is well known and understood, the RFID microchip may passively or actively transfer certain ID data tagged to a component 107 when an RFID transceiver device associated with (or integral to) MRI device 105 is placed nearby or in proximity to the tagged component. Accordingly, the RFID microchip 108 may comply with such standards as ISO 14443 or ISO 15693 for proximity or vicinity RFID. To enable the MRI to access the Registry Database, the RFID device 108 may also transmit certain additional resource-accessing information. The information stored on the RFID microchip may include, among other things, an irrigation system ID, a component ID, a nozzle serial/part number and/or a digital XML message or the like for displaying on the MRI device 105 or forwarding to the Registry Database 101. For example, a user may use data or a displayed message from the RFID chip concerning a tagged component to visually compare it against previously downloaded SPC file information from Registry Database 101 for manually checking and verifying proper component type and location. Alternatively, this verification process could be carried out automatically by a proprietary Registry Interface software application running on an MRI device 105, as discussed below.

For example, a component ID or serial number may enable an MRI device 105 to search the Registry Database 101 directly or via the Website Server 102. Based on the component ID information obtained from the RFID tag device 108 and communicated to the Registry Database 101 or the Website Server 102 by MRI device 105, information may be sent to the MRI device 105 for identifying the type/model of component, an SPC file ID for accessing the appropriate associated SPC file, a geographic location where the registered component or irrigation system should be located, an internet protocol (IP) address device for accessing another website, and/or any other potentially relevant data or information useful for aiding a user in verifying that the component is installed in the proper location within the irrigation system and has the proper specifications for that installation. Moreover, an XML message or the like may be sent from the Website Server 102 or database 101 to the MRI device 105 to provide information, such as a confirmation message or indication that the component is the correct component for that position/location or the component model/make, serial number, the type of component, and/or a boom or outlet position where the component should be located.

FIG. 1 also illustrates a barcode tag 109, which may be either of a conventional one-dimensional linear barcode or a two-dimensional (2-D) matrix type barcode capable of encoding additional data pertaining to the component to which it is attached. The barcode tag 109 may also be provided with an adhesive or other conventional means for attaching the printed linear or matrix barcode to the component 107. In the same manner as the RFID tag example, a barcode tag 109 is placed on an irrigation system component such as a sprinkler head/nozzle component 107 to provide component ID and/or other information to MRI device 105. For example, barcode tag 109 may be used to inform MRI device 105 as to a particular component's serial number or ID and/or a particular SPC file ID in the Registry Database 101 in which the component is registered and/or to which particular irrigation system the component belongs. If a 2-D matrix barcode is used, it may convey much more information than a conventional one-dimensional barcode. For example, a 2-D matrix barcode may include all the above information plus provide a specific Internet Web page URL address for the MRI device 105 to access for obtaining direct access to information stored in Registry Database 101. One conventional type of 2-D barcode contemplated for use is called a "QR" code which was created by Toyota subsidiary Denso-Wave in 1994. ("QR" being an abbreviation for "Quick Response".) Users with a "smart" camera phone equipped with the correct reader application can scan the image of a QR Code to display text, contact information, connect to a wireless network, or open a web page in the phone's browser. This act of linking from physical world objects is conventionally known as a hardlink or physical world hyperlinks. Blackberry phones running Blackberry Messenger 5.0 (or more recent versions)

can also scan QR codes using the "Scan A Group Barcode" option in the BBM menu. Both the Android Market and the iTunes App Store offer several free applications that can decode QR matrices. Similar software can be downloaded and installed onto Nokia S60 phones.

The MRI device 105 of FIG. 1 may also include a camera (not shown) for obtaining digital images, which in combination with conventional optical character recognition (OCR) software, barcode-reading software, or matrix-code-reading software running on MRI device 105, may be used to acquire data and other information from printed materials having text or barcode information. Thus, a barcode tag 109 may be particularly effective when used on an irrigation system component 107 where MRI device 105 is not capable of receiving an RFID device signal.

Figure 2:
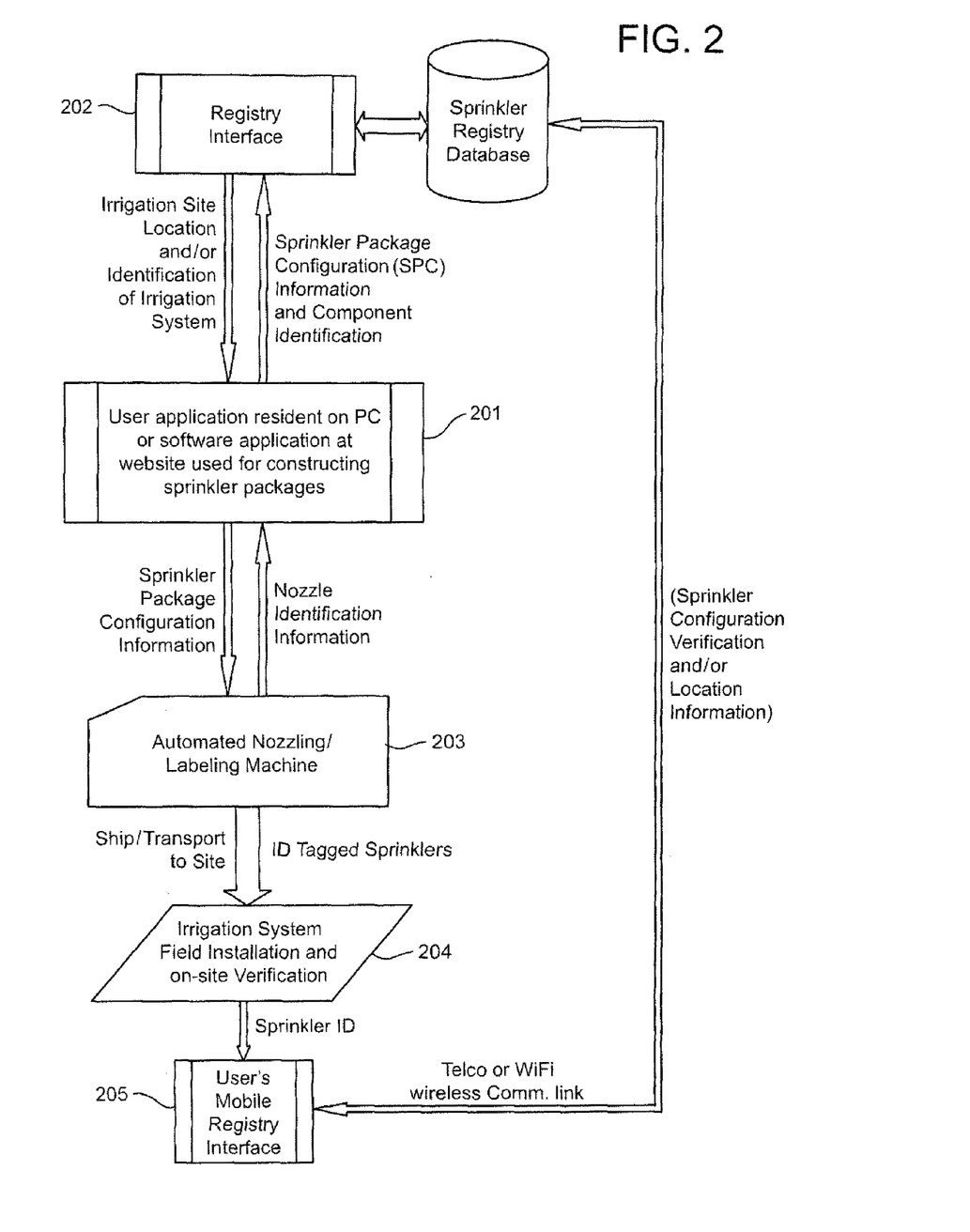
FIG. 2 is a process flow diagram illustrating general information exchange and processing in a nonlimiting example embodiment of the agriculture irrigation system design registration and component verification system.

Referring now to FIG. 2, a process flow diagram is shown illustrating the basic data processing and information exchange which takes place in a nonlimiting example embodiment of the disclosed agriculture irrigation system design registration and in-situ verification system. As indicated at blocks 201 and 202, a proprietary Registry Database Interface (RI) software application is either resident as an application running on a user's workstation/PC 103 or is made available from a proprietary Internet Website Server 102. In this nonlimiting example implementation, a sprinkler head/nozzle component ID is automatically created or assigned either by a proprietary SPC user interface software application 201 running on a user's PC or by an interactive application made available at a proprietary Internet website provided for communicating with database server system 101. The interface software provides an interactive interface to assist the user in designing an irrigation system and registering the design in the proprietary database 101. The user's PC interface application software 201 or the Registry Database Interface 202 may communicate a user's component selections and specifications to a component labeling machine/system, represented by block 203, which is used to attach a tag (108/109) containing a unique RFID or a barcode to each component/part and then communicates the tag ID or tag information to RI software 201 and/or to the Registry Interface 202 via local network connection or the Internet. For example, an automated nozzling/labeling machine (not shown) may be used for labeling sprinkler nozzles each with a unique tag and then delivering them to a packaging station for assembling into a sprinkler package for delivery to an installation site. The unique information or ID to be contained on each tag that is to be associated with a particular component, which may be configured by the interface application 201 or the Registry Interface 202 according to a user's selections, may be communicated to an automated nozzling/labeling machine and registered in Registry Database 101 and/or the automated nozzling/labeling machine may communicate specific tag ID or other information such as nozzle identification to the user's PC application 201 or registry database interface 202, as indicated at block 203. Tagged nozzles and possibly other components are then collected/assembled together into a "sprinkler package" for delivery to a specific irrigation system installation site. Through the use of the RI application operating on a user PC or other computer workstation connected to the Internet, the user may enter and register, retrieve and review, or revise, the SPC information associated with a particular irrigation site.

As illustrated by block 204, once at the irrigation system installation site, each nozzle or other component having an ID tag can be identified in situ at the irrigation site and its assigned position and type/model can thereby be easily checked and verified during the installation process by reference to SPC file information associated with that specific irrigation system site. Preferably, this is accomplished through the use of a location-aware Mobile Registry Interface (MRI) device 105 which incorporates or utilizes additional hardware/circuitry (e.g., barcode scanner or RFID transponder) appropriate for wirelessly acquiring the ID tag information. As indicated at block 205, the portable MRI device 105 communicates wirelessly with the Registry Database 101 via conventional RF telecommunication or WiFi transmission to obtain the SPC file information specific to the irrigation system site and location to enable the user to check and verify any ID tagged component against the previously registered design specifications for that site.

Figure 3:
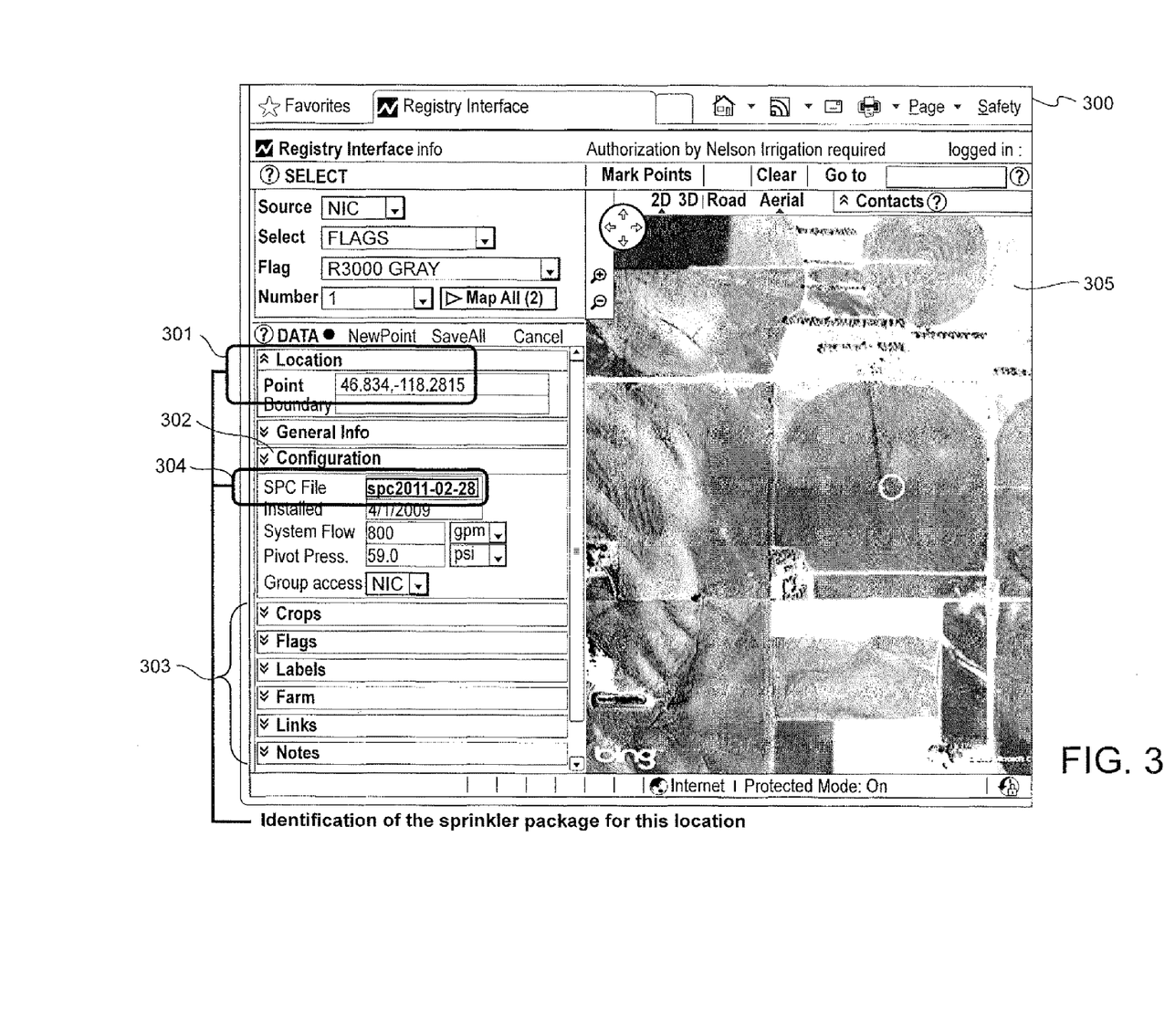
FIG. 3 is a nonlimiting example illustration of a Registry Interface application screen display for enabling a PC user to access the Registry Database and register a sprinkler configuration package for an irrigation system.

FIG. 3 shows a nonlimiting example illustration of a screen display provided on a PC or workstation 103 by the RI software application which enables a user to directly access Sprinkler Registry Database 101 to initially enter and register a Sprinkler Package Configuration (SPC) or to retrieve previously registered SPC file information specific to a particular irrigation system by inputting and referencing a specific geographic location or a specific SPC file ID. Preferably, Sprinkler Registry Database 101 is a secure database containing irrigation system configuration information in the form of SPC files associated with a particular file ID or a specific geographic location. In this example, the RI application on a user's PC provides a display that takes the form of a conventional Windows interface.

In a nonlimiting example implementation, the registry interface (RI) application software is capable of providing one or more display screens of compiled information relating to a particular irrigation system. The information is provided to a user on a display of a workstation/PC 103 or a user's Mobile Registry Interface device 105 in the form of one or more graphical user interfaces (GUIs) or graphic interface screens. For example, FIG. 3 depicts a nonlimiting example screen 300 displaying a plurality of GUIs including drop-down menu buttons and data I/O fields. These GUIs may be displayed as icons or shaped buttons which represent specific functions, data fields or irrigation system components available for selecting, specifying or inputting information relevant to the design and configuration of a particular irrigation system. For example, the "SPC File" GUI 304 provides a field for entering a specific SPC file name or ID to be associated with the SPC file stored in the Registry Database containing all the information entered and registered by a user for a particular irrigation site. A drop-down "Location" menu GUI provides a "Point" input field 301 for entering or designating the latitude and longitude of a particular irrigation site. In certain instances, for example when initially registering an irrigation system, "Point" input field 301 may be used as an input field for the user to specify and enter a specific geographic location for a particular irrigation system.

In a preferred implementation, all the information in a particular SPC file stored in the Registry Database is associated with a specific location identified by the "Point" input field 301 and that SPC file is identified by the SPC file ID specified in the "SPC Field" input field 304. A drop-down "configuration" menu GUI 302 provides other types of I/O fields useful for specifying or reviewing other irrigation system related information such as an SPC file ID, an installation date, system flow rate, pivot pressure and the like. Other drop-down GUI menus 303 are also provided for entering or reviewing specifications related to such things as the type of crops being irrigated, specific farm or field related information, and other irrigation system related flags, labels, notes or links to other useful websites. Another section of the example Registry Interface screen 300 is used to display one or more geographic maps, birds-eye-view or satellite images 305 of the registered irrigation system site. Such images and maps may be input by the user or may be provided by the Registry Interface application software automatically by fetching the images from conventional Internet-based sources such as Google Maps or Microsoft's Bing.

Figure 4A:
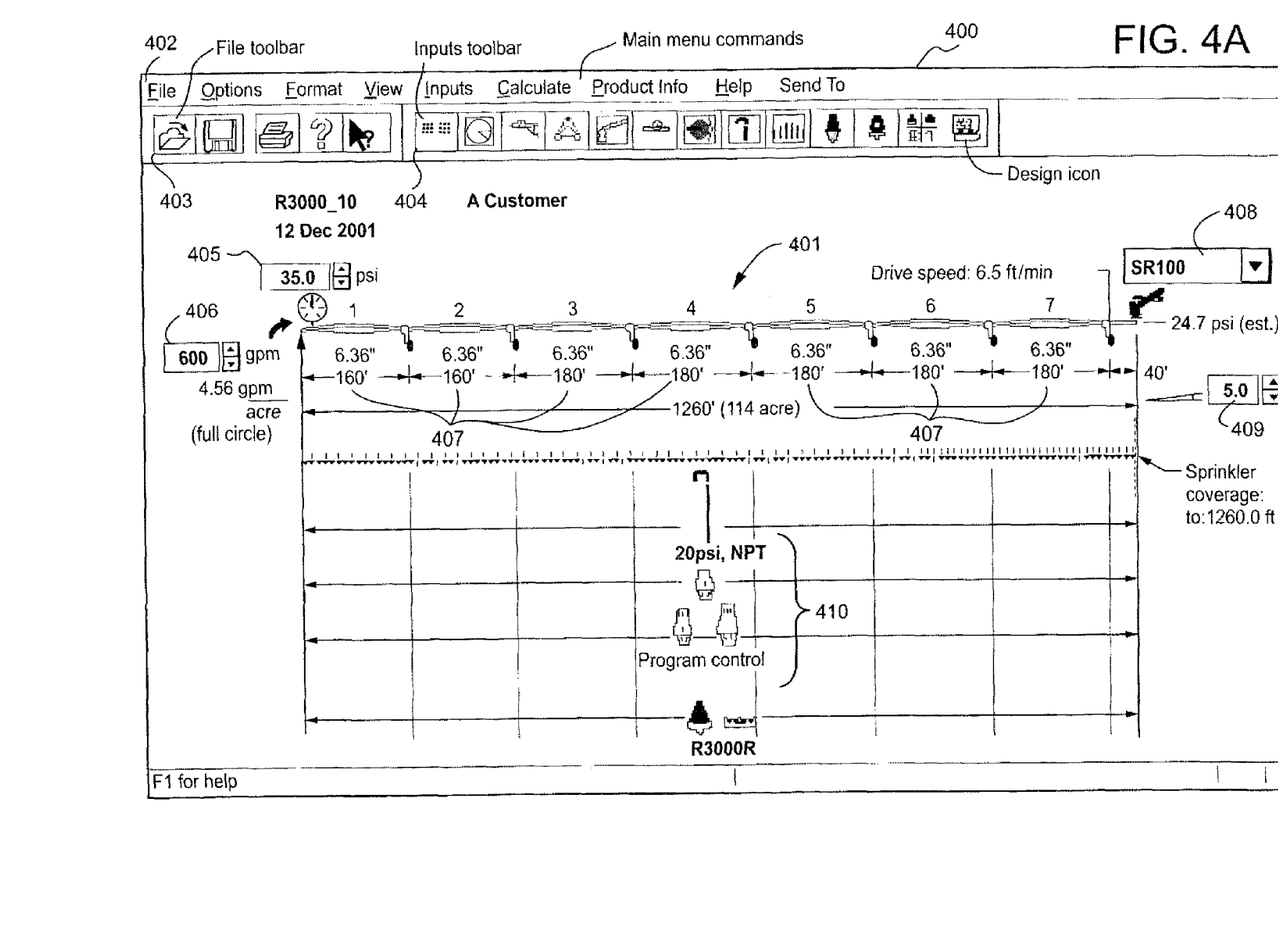
FIG. 4A is a nonlimiting diagrammatic illustration of a Registry Interface application screen display for enabling a PC user to set up, modify or verify a sprinkler configuration package for an irrigation system.

Another feature of the agriculture irrigation system design registration and verification system disclosed herein is to provide users with the convenience and choice of either using a PC (personal computer) based program application for inputting, registering and verifying irrigation system information or simply using a conventional web browser to access an Internet website that provides the same functionality. To this end, it is contemplated that a proprietary PC-based software application program is made available to users and/or that an Internet website server be set up for providing users with readily accessible interactive tools for custom designing an irrigation system, configuring a sprinkler package and registering the irrigation system specifications in the Registry Database in the form of an SPC file or the like. In FIG. 4A, a diagrammatic illustration is provided of an example screen display which is contemplated as being provided on a proprietary website or, alternatively, provided in a proprietary PC-based software application for enabling a PC user to design and specify components for a center pivot irrigation system. In this nonlimiting illustrative example, screen display 400 is provided with a top menu bar 402 having GUI icons or menu buttons, and a graphic virtual work area having an image area and a plurality of GUI icons, buttons, text input fields and graphics for enabling a user to interactively designate, specify, select and position various irrigation system components along a virtual boom-line so as to specify a desired design for the physical layout for a center pivot irrigation system.

As one skilled in the art may appreciate, graphics and GUIs other than those disclosed and depicted herein may be displayed for use in designing, outfitting and/or registering other types of irrigation systems such as linear movement or stationary systems. In the nonlimiting example depicted herein, a graphical representation of a boom line 401 is displayed in a center section of screen display 400 below a menu bar 402. It is also contemplated that screen display 400 include a plurality of tool bars having one or more related GUI menu buttons such as a File toolbar 403 for selecting different file access, maintenance and storage operations, as well as an Inputs toolbar 404 which each display one or more buttons for selecting a variety of other program tools or operations for designing and/or registering irrigation system specifications. As shown in FIG. 4A, it is further contemplated that the website and/or the proprietary application software also provide the user with a plurality of GUIs for inputting and/or selecting specific dimensional specifications or displaying other information relating to, among other things, boom line pressure 405, distribution rate 406, the number and spacings of outlets 407, sprinkler heads 408, boom drive speed, sprinkler coverage, distribution angle 409, and icons 410 for indicating the different nozzle types/models. It is also contemplated that, based on a user's inputs and component selections, the software application will automatically and interactively perform the computations/calculations needed to determine and display, among other things, proper outlet locations, flow rates, and suggested nozzle sizes and/or model/types which are most appropriate to meet a user's specific design goals and irrigation site requirements. For example, the screen 400 may include one or more GUIs 405-409 for inputting/setting desired parameters such as boom-line pressure, flow rate, sprinkler heads/nozzles, and the software application will interactively compute and display, for example, numerical indications 407 representing the resulting proper outlet separations along the boom.

Figure 4B:
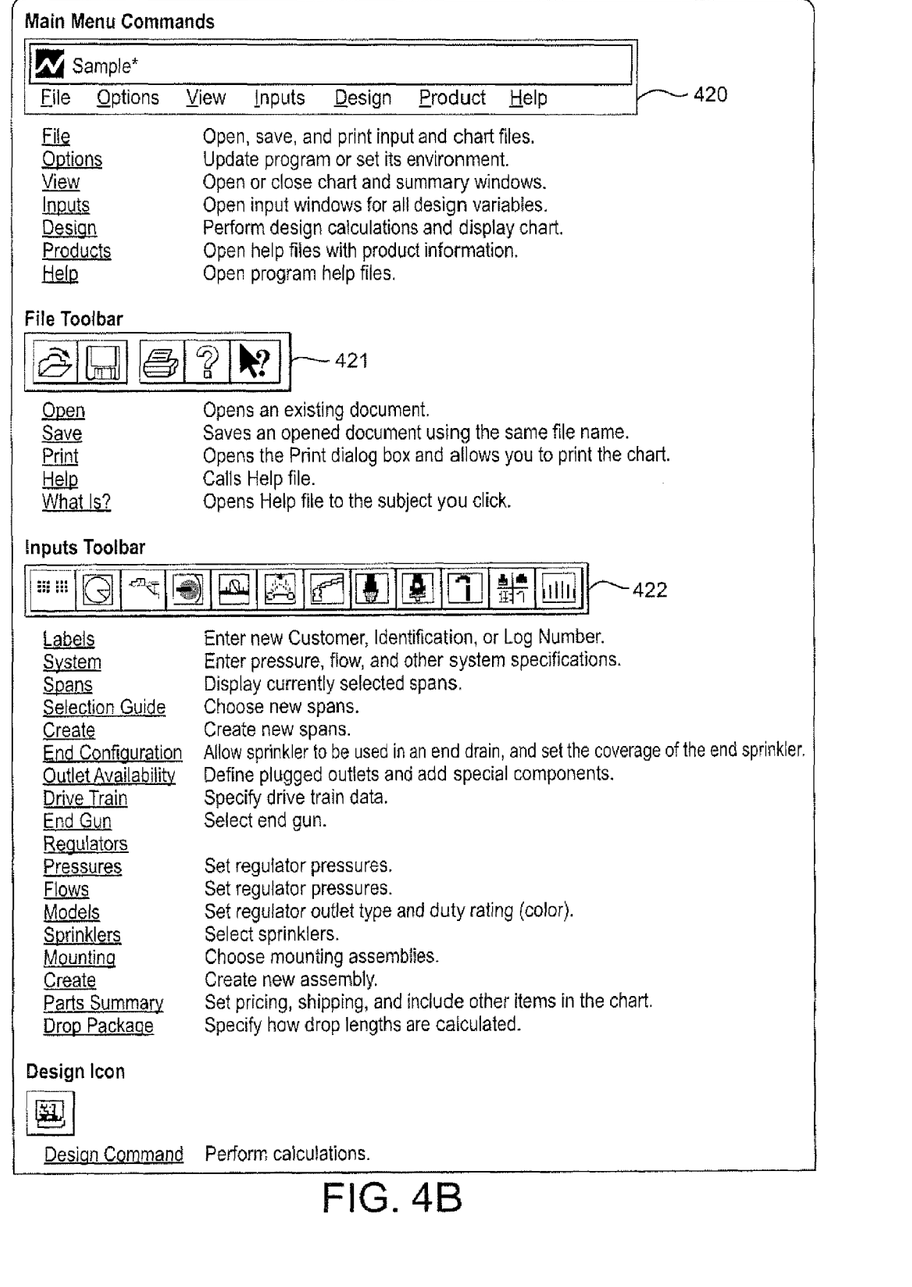
FIG. 4B is a nonlimiting, non-exhaustive listing illustrating example GUI menu buttons and corresponding functional descriptions for use in a Registry Interface application.

FIG. 4B provides a nonlimiting, non-exhaustive listing that illustrates some example GUI menu buttons that may be provided on the screen display 400, the "Main" 420, "File" 421 and "Inputs" 422 toolbars along with a description of their corresponding functional operations as contemplated for use on a website application or a PC-based software application such as that described above in regard to FIG. 4A.

Figure 4C:
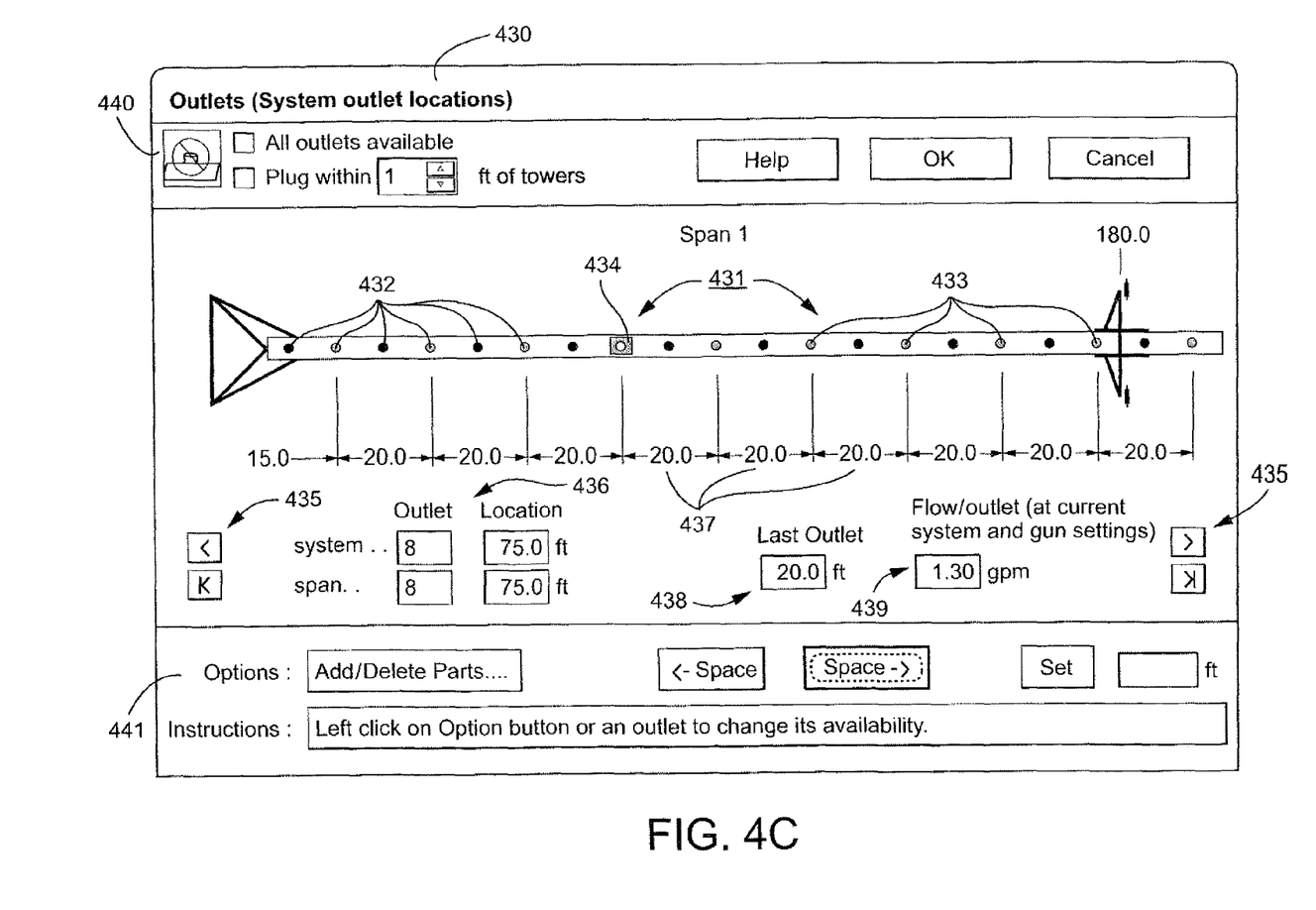
FIG. 4C is another nonlimiting example diagrammatic illustration of a Registry Interface application screen display for enabling a PC user to set up, modify or verify a sprinkler package configuration for an irrigation system.

FIG. 4C shows another nonlimiting example illustration of a screen display contemplated as being provided by an interactive website page or PC-based application such as that described above in regard to FIG. 4A for enabling a PC user to design and specify components for a center pivot irrigation system. In this example, an "Outlets" screen 430 depicts an interactive virtual graphic 431 of a span of sprinkler outlets in a center pivot irrigation system as seen from an overhead (top down) view. The graphic image 431 of the sprinkler system illustrates multiple outlets 432 arranged along the length of a boom (dark and light dots) and provides computed or preferred inter-sprinkler spacing dimensions to be implemented between adjacent sprinkler heads 433 (light dots) for outlets along the boom. In addition, it is contemplated that the Outlets screen 430 interactively provides the specifications for any particular user-selected sprinkler head (e.g., indicated by highlighted head 434) and also displays other relevant information in GUI text fields 436-439 such as, for example, computed inter-sprinkler dimensions 437 for spacings between adjacent sprinkler heads, outlet number, outlet location, flow rate, etc. In this example, several GUI buttons are provided to allow the user to select which particular sprinkler or outlet along the boom is selected for having its specifications displayed. For example, multiple GUI buttons, indicated by the numeral 435, allow for left or right scrolling of the position of a highlighted head 434 appearing in graphic image 431 for which specification are currently being displayed on other parts of the screen. Preferably, Outlets screen 430 also graphically depicts other irrigation system information and configuration information such as outlet number, outlet location 436, flow per outlet, etc. For example, below virtual graphic image 431, various specifications for the outlet sprinkler head corresponding to the position of highlighted box 434 are displayed. It is also contemplated that a portion 441 of Outlets screen display 430 provide GUIs for checking the availability of outlets to place a sprinkler head or for changing positions of sprinkler heads to different outlets. For example, Outlets screen display 430 may include upper and lower menu bar areas 440 and 441 for displaying various other information panels and/or selection buttons/boxes for enabling the user to input or edit part selections or for providing specific instructions for the user, and/or for providing access to other user interface tools such as text editing tools and conventional "help", "cancel" and "OK" buttons, etc.

Figure 4D:
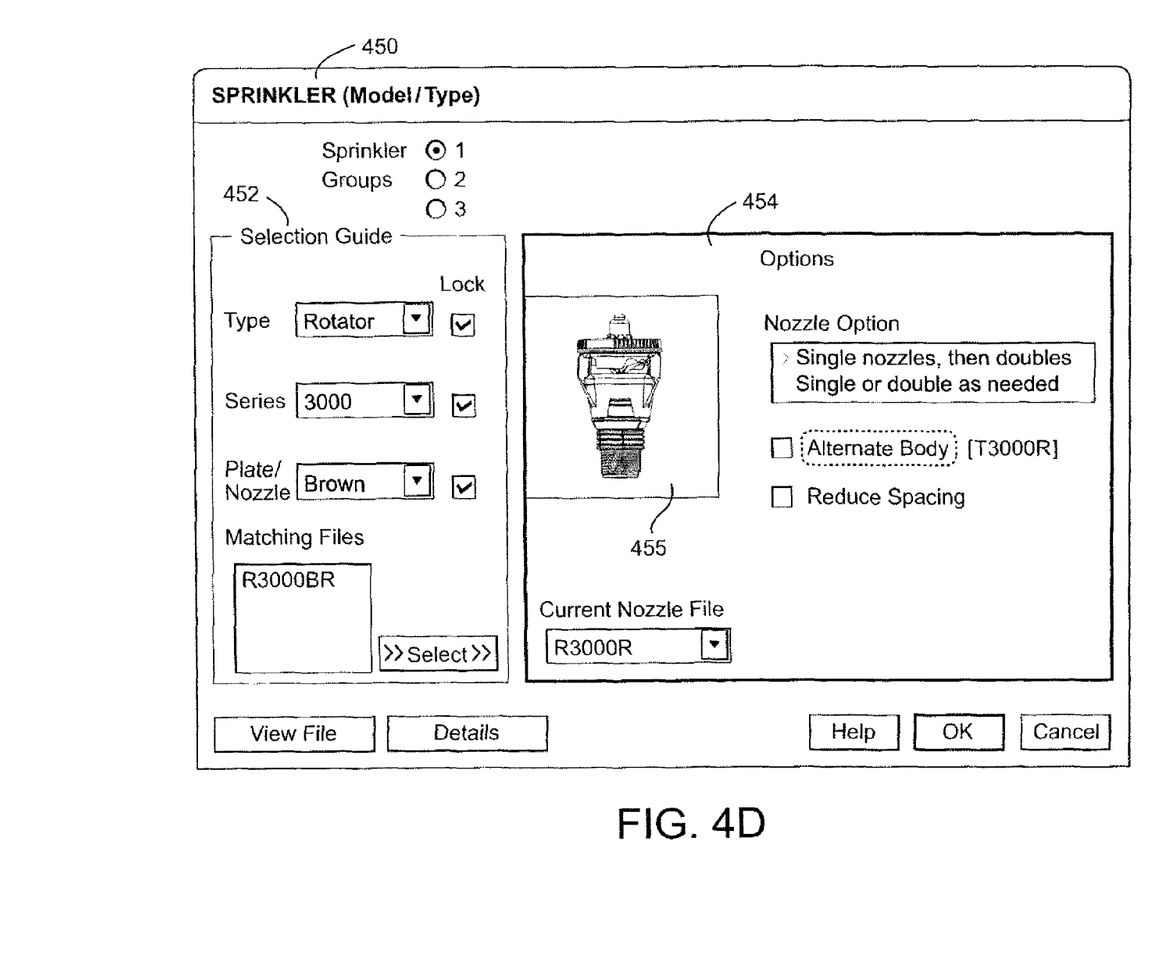
FIG. 4D is a nonlimiting example diagrammatic illustration of a Registry Interface application screen display for enabling a PC user to select, modify or verify a particular sprinkler head nozzle type/model.

FIG. 4D shows yet another nonlimiting example illustration of a screen display contemplated for enabling a user to specify/select a particular sprinkler head/nozzle model. In this example, a "Sprinkler" screen 450 provides a sprinkler head "Selection Guide" area 452 having various input fields and drop-down menus for enabling a user to view and select among various sprinkler types, series and nozzle or plate types that are available from a manufacturer. A different portion of the screen display 454 may be used, for example, to provide the user with various options for inputting, selecting and reviewing different sprinkler head/nozzle models and/or for graphically depicting a representation of a particular sprinkler head model designated in the Selection Guide area.

Alternatively, an actual photographic image of a designated sprinkler head/nozzle may be provided in screen portion 455 instead of a graphic representation.

Referring again to FIG. 1, Mobile Registry Interface (MRI) devices 105 preferably include hardware for wirelessly accessing Registry Database 101 by using, for example, conventional cellular telecommunications or other RF communications and a conventional Telco/Wi-Fi/WiMax Internet access point 104. It is contemplated that MRI devices 105 operate using an HTML5 capable web browser or a proprietary Registry Interface (RI) software application (app) for communicating, accessing and providing a user interface with proprietary Website Server 102 and/or Registry Database 101. Alternatively, MRI device 105 could use an open-source application or an open-source browser engine such as Apple®'s WebKit for handsets. In the context of the examples disclosed herein, an "application" or "app" is intended to refer to a software program customized for specific devices such as smart phones or tablet computers for delivering or sending information without requiring the user to go to a specific page on the World Wide Web. Portable Mobile Registry Interface (MRI) devices 105 are preferably location-aware having incorporated appropriate hardware for implementing GIS and/or GPS location-determining technology. A contemplated RI software application operating on portable Mobile Registry Interface (MRI) devices 105 uses the current geographic location of the device, or allows a user to input a geographic location of a particular irrigation system, and then retrieves and displays corresponding SPC file information and/or an image or graphical representation of the irrigation system. As explained above, the Registry Interface (RI) application running on MRI devices 105 is contemplated to enable a user to visually check and verify positions and locations of one or more sprinkler head/nozzle components or other tagged component of an irrigation system by comparing acquired tag ID information with associated sprinkler package configuration data registered in Registry Database 101.

In one nonlimiting illustrative example implementation, portable Mobile Registry Interface (MRI) devices 105 preferably are location-aware, have incorporated GIS and/or UPS technology hardware, a processor and a display, and are capable of executing proprietary mobile irrigation system mapping software that enables a user physically located at a particular irrigation installation site to generate, map and seamlessly upload "as built" irrigation system architectural and/or component configuration information to a remote proprietary database and/or download related irrigation system sprinkler package configuration (SPC) information to update or perform in-situ verification of that information.

Figure 5A:
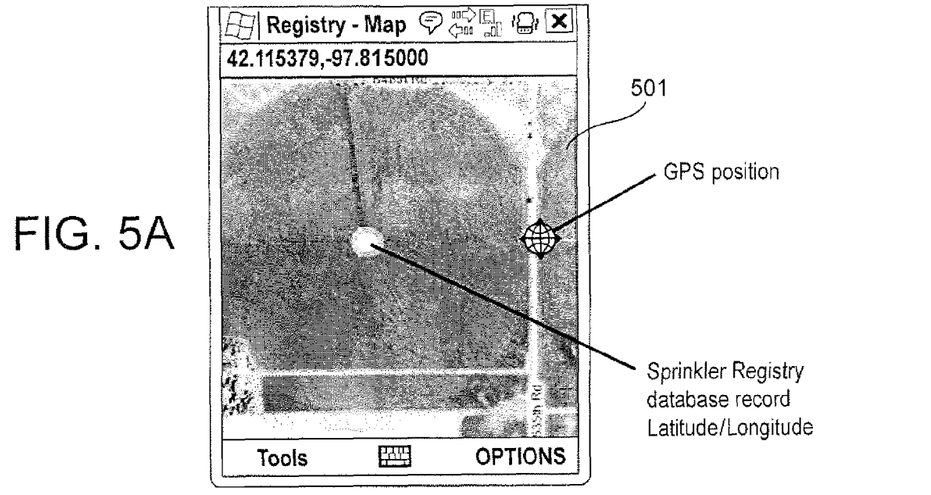
FIGS. 5A and 5B illustrate nonlimiting example screen displays provided on a display screen of a portable/mobile registry interface (MRI) device when running a software application for providing a user with remote access to irrigation system information stored in the Registry Database.
Figure 5B:
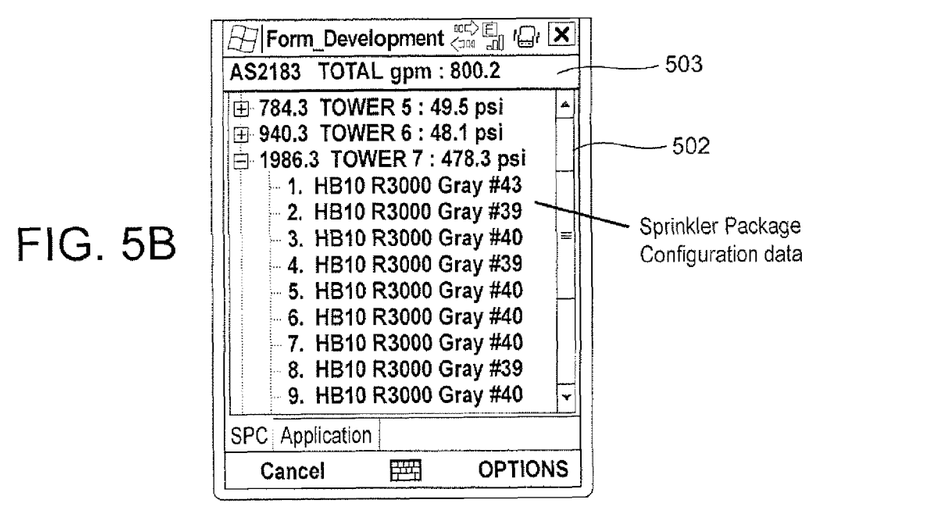

For example, one contemplated mobile mapping and Registry Interface (RI) software application operating on MRI device 105 would provide at least an interactive graphic interface that retrieves and displays SPC file information from Registry Database 101. FIGS. 5A and 5B illustrate two non-limiting example-contemplated screen displays that may be displayed on MRI device 105 by a contemplated mobile mapping and Registry Interface (RI) application while the device seamlessly communicates wirelessly with the Registry Database 101 to provide the user with information specific to a particular irrigation system. FIG. 5A illustrates a "Registry-Map" screen that may be displayed when the RI application running on the MRI device responds to a search of the Registry Database for irrigation system records corresponding to a particular GPS location. FIG. 5B illustrates a "Form_Development" screen that may be displayed by the RI application for showing a user the SPC data associated with a particular irrigation system. Preferably, MRI devices 105 use an integral GPS receiver and are capable of using GPS location data to retrieve specific SPC file information for a particular irrigation system based, for example, on a current location of a user holding the device. However, it is also contemplated that an MRI device without an integral GPS receiver may be used and that particular geographic location data or other identifying information corresponding to a particular irrigation system may be manually input and used to retrieve a relevant SPC file as well as other related records and images from the Registry Database. Accordingly, it is contemplated that an MRI device may be used at an irrigation site to access an appropriate SPC file in the Registry Database either automatically or manually and display corresponding SPC file information. In this manner, an MRI device 105 enables a user to check and verify that the position and specifications of a particular component inspected while in the field at the irrigation system site is indeed a correct component in accordance with associated registered sprinkler configuration package data for that irrigation system.

For example, in response to user inputted latitude and longitude data or a received GPS signal, the MRI device RI application may automatically retrieve information corresponding to the closest irrigation site and provide a screen display as shown in FIG. 5A. It is contemplated that the screen display may include one or more GUI icons and data input fields for entering commands and a screen portion for displaying an aerial view or satellite image of an irrigation site. As illustrated in FIG. 5A, a contemplated screen presents a satellite image 501 of an irrigation site along with other GUIs for executing specific functions or inputting location data or commands for obtaining or verifying information about a particular irrigation system. In this example, the screen display 5A includes a title menu bar having a plurality of GUI icons at an upper portion of the display for providing other information or specific functions that may be made available to the user such as scrolling the image or selecting another map. Provided on a lower portion of the display is a keyboard icon for selecting a conventional keyboard text entry display (not shown) and a "Tools" and "Options" GUI. FIG. 5B illustrates a different screen display 502 contemplated for enabling the user to see and review specific SPC file information and irrigation system specifications associated with a particular SPC file identified by the SPC file ID "AS2183" displayed in a system ID bar 503.

As described above, an implementation of the method and apparatus disclosed herein may be in the form of computer-implemented processes and apparatuses for practicing those processes. An implementation may also be practiced or embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the disclosed process or method. An implementation may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the disclosed process or method. When implemented on a general-purpose programmable microprocessor or computer, the computer program code configures the programmable microprocessor or computer to create specific logic circuits (i.e., programmed logic circuitry).

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, nonvolatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance with this logic operates as "programmed logic circuitry" to perform the operations defined by the logic.

While a disclosed method and apparatus is described with reference to one or more exemplary embodiments, it will be understood by those skilled in the art that various changes may be made and equivalence may be substituted for elements thereof without departing from the scope of the claims. In addition, many modifications may be made to the teachings herein to adapt to a particular situation without departing from the scope thereof. Therefore, it is intended that the claims not be limited to the specific embodiments disclosed, but rather include all embodiments falling within the scope of the intended claims. Moreover, the use of the terms first, second, etc. does not denote any order of importance, but rather such terms are used solely to distinguish one claim element from another.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the above systems and methods have been described in detail, the foregoing description is in all aspects illustrative and not restrictive. It is understood that numerous other modifications and variations can be devised.

What is claimed is:

1. An Internet-accessible registration and component verification system for agriculture irrigation systems, comprising:
    at least one server for providing an irrigation system registration web site accessible via the Internet;
    an Internet-accessible irrigation system information database in data communication with said server and configured to store sprinkler package configuration (SPC) information defining specific irrigation system components and their respective arrangement within a particular system, and geographic location information associated to one or more discrete irrigation systems;
    a geographic location-aware handheld mobile device configured for use at an irrigation site to receive ID information of an irrigation system component directly from the irrigation system component at the irrigation site and to wirelessly communicate with the irrigation system information database to obtain SPC information specific to the irrigation site; and
    an interactive user interface to the database, the user interface accessible via a terminal or the mobile device and configured to enable a user to register or retrieve geographic location information associated with each irrigation system component in the SPC information associated to a particular irrigation system;
    wherein the registration and component verification system is configured to enable a user to check and verify irrigation system components which are in place at the irrigation system site and placement locations of the components within the irrigation system at the irrigation site based upon a current geographic location of the mobile device, an ID obtained from a component by the mobile device and the SPC data associated to the irrigation site.

2. The system as set forth in claim 1 further comprising an automated labeling machine for placing physical tags on components and conveying component related information uniquely associated with each tag to the registration database for storage in association with SPC information for a particular irrigation site.

3. A method for in-situ checking and verification of an irrigation system component, comprising:
    providing an Internet-accessible registry database for registering and storing information specific to one or more irrigation systems, the information comprising at least geographic location information and component specification information;
    providing an irrigation system component having an attached physical tag or label, the component being specific to a particular irrigation system and the tag/label capable of conveying certain information about the component including at least information useful for accessing corresponding information in the registry database;
    providing a software application for use on a portable computer-controlled registry interface device having a display and being operable by a user in-situ at or near an irrigation system site, the software application configured to cause the interface device to wireless acquire certain information from a tag/label attached to an irrigation system component and to wirelessly access the registry database for retrieving corresponding registered information specific to a particular irrigation system or component from the registry database based on the certain information acquired from a component tag/label; and displaying information retrieved from the registry database on the display of the portable computer-controlled registry interface device, wherein information stored in the registry database is retrieved and used on site to check and/or verify that a checked irrigation system component and location of the component at the site correspond to a particular pre-registered irrigation system.

4. The method of claim 3 further comprising providing an Internet-accessible user interface for registering an irrigation system and inputting at least one of irrigation system component information and corresponding geographic location information.

5. The method of claim 3 further comprising providing a website accessible registry having an interactive user interface for registering and accessing sprinkler package configuration (SPC) information via the Internet.

6. The method of claim 5 wherein the sprinkler package configuration (SPC) information for a particular irrigation system is identified by a specific ID or is associated with specific geographic location information.

7. The method of claim 3 wherein the portable computer-controlled device registry interface device includes circuitry for wirelessly accessing the Registry Database via conventional Telecommunications or WiFi/WiMAX communications.

8. The method of claim 3 further comprising wirelessly acquiring information from a tag or label attached to an irrigation system component by using the portable computer-controlled registry interface device, wherein specifications corresponding to the component are automatically checked by the registry interface device against sprinkler package configuration information associated with a particular previously registered irrigation system that is stored in the registry database.

9. The method of claim 3 wherein the ID tag is an RFID device and the portable computer-controlled device includes integral or operatively connected circuitry that is capable of receiving transmitted RFID information when in proximity to a sprinkler head.

10. The method of claim 3 wherein the ID tag is a barcode label and the portable computer-controlled device includes a barcode reader device that is either integral or operatively connected thereto.

11. A global position-aware mobile registry interface device used for wirelessly acquiring information of an irrigation system component by a user in situ and for wirelessly accessing an Internet-based registry database containing pre-registered sprinkler package configuration information defining specific irrigation system components and ter arrangement within a particular irrigation system, the mobile registry interface device comprising:
a display;
a processor;
a memory for storing digital data including software comprising instructions for controlling the processor;
an RFID or barcode reader for wirelessly acquiring information from a tag/label attached to an irrigation system component;
RF communications circuitry for wirelessly accessing a WAN or the Internet; and
registry interface software operable on the processor for:
(a) providing an interactive user interface for exchanging information with the Internet-based registry database;
(b) inputting information wirelessly acquired from a label/tag attached to an irrigation system component;
(c) transmitting component information and/or GPS-based position information to the Internet-based registry database; and
(d) receiving and displaying irrigation system information or component specification information received from the registry database;
wherein said pre-registered sprinkler package configuration information and/or individual component specification information identified according to information acquired from a label/tag attached to an irrigation system component may be obtained from the registry database and displayed on the mobile registry interface device of a user located at the irrigation system site for performing in-situ checking and verification of one or more irrigation system components.

12. The mobile interface device of claim 11 wherein the registry interface software operable on the processor comprises an HTML5 capable web browser.

13. The mobile interface device of claim 11 including software operable on the processor for implementing irrigation system component mapping using GPS or GIS data.

14. An Internet website accessible system for registering sprinkler package configuration (SPC) information and performing in-situ checking of component configurations for agriculture irrigation systems, comprising:
an Internet-accessible website server and registry database for registering and storing sprinkler package configuration data specific to one or more irrigation systems, the website server and registry database including one or more computer processor configured to:
store SPC data for one or more irrigation systems in said registry database, the website server and registry database operatively connected to a WAN or the Internet, and the SPC data for each irrigation system comprising an irrigation system site ID, geographic location data indicative of a global position of the irrigation system, and component configuration data which specifies locations of sprinkler components within the irrigation system and includes component specification data for one or more sprinkler components of the irrigation system.

15. A method for in-situ checking and verification of an agriculture irrigation system component, comprising:
providing an Internet-accessible web site server and registry database for registering and storing sprinkler package configuration information defining specific irrigation system components and their respective arrangement within a particular irrigation system and including at least sprinkler nozzle type/model information for one or more sprinkler heads used in a particular irrigation system;
labeling a sprinkler head nozzle with a specific ID tag prior to installing the nozzle at a particular irrigation system site, the ID tag providing identification information specific to each sprinkler head nozzle used in a particular irrigation system in accordance with sprinkler package configuration information registered and stored in said database; and
providing a GPS location-aware portable registry interface device operable at or near an irrigation system site for wirelessly accessing the registry database and retrieving previously registered sprinkler package configuration information specific to a particular irrigation system or component from the registry database based on GPS location information from the device and component identification information obtained from the ID tag on a sprinkler head, wherein a nozzle type/model of one or more sprinkler heads associated with a particular irrigation system is verified by retrieving corresponding sprinkler package configuration information for a particular irrigation system using the location-aware portable device on site at an irrigation system.

16. The method for in-situ checking and verification of an agriculture irrigation system component according to claim 15 wherein the ID tag is an RFID device and component identification information is wirelessly communicated to the registry interface device from an RFID tag on a sprinkler head.

* * * * *